(12) United States Patent
Babcock et al.

(10) Patent No.: US 10,570,332 B2
(45) Date of Patent: Feb. 25, 2020

(54) Y-GRADE NGL FLUIDS FOR ENHANCED OIL RECOVERY

(71) Applicants: Linde Aktiengesellschaft, Munich (DE); John A. Babcock, Houston, TX (US)

(72) Inventors: John A. Babcock, Houston, TX (US); Charles P. Siess, III, Conroe, TX (US); Kevin G. Watts, Spring, TX (US)

(73) Assignee: Linde Aktiengesellschaft, Munich (DE)

(*) Notice: Subject to any disclaimer, the term of this patent is extended or adjusted under 35 U.S.C. 154(b) by 0 days.

(21) Appl. No.: 15/680,907

(22) Filed: Aug. 18, 2017

(65) Prior Publication Data

US 2018/0058182 A1    Mar. 1, 2018

(51) Int. Cl.
| | |
|---|---|
| *E21B 43/16* | (2006.01) |
| *C09K 8/34* | (2006.01) |
| *C10L 3/06* | (2006.01) |
| *C09K 8/594* | (2006.01) |
| *C09K 8/584* | (2006.01) |
| *C09K 8/588* | (2006.01) |

(52) U.S. Cl.
CPC ............. *C09K 8/594* (2013.01); *C09K 8/34* (2013.01); *C09K 8/584* (2013.01); *C09K 8/588* (2013.01); *C10L 3/06* (2013.01); *E21B 43/162* (2013.01); *E21B 43/166* (2013.01)

(58) Field of Classification Search
None
See application file for complete search history.

(56) References Cited

U.S. PATENT DOCUMENTS

| | | |
|---|---|---|
| 3,035,637 A | 5/1962 | Allen |
| 3,316,965 A | 5/1967 | Watanabe |
| 3,319,712 A | 5/1967 | O'Brien |
| 3,368,627 A | 2/1968 | Hurst et al. |
| 4,490,985 A | 1/1985 | Wells |
| 4,511,381 A | 4/1985 | Mehra |
| 4,576,005 A | 3/1986 | Force |
| 6,230,814 B1 | 5/2001 | Nasr et al. |
| 7,373,790 B2 | 5/2008 | Clare et al. |
| 7,527,096 B2 | 5/2009 | Chung et al. |

(Continued)

FOREIGN PATENT DOCUMENTS

| | | |
|---|---|---|
| CA | 2900179 A1 | 10/2015 |
| CN | 201885591 U | 6/2011 |

(Continued)

OTHER PUBLICATIONS

Australian Examination Report dated Oct. 4, 2017, corresponding to Application No. 2015336280.
(Continued)

*Primary Examiner* — Jeffrey D Washville
(74) *Attorney, Agent, or Firm* — Patterson + Sheridan, LLP

(57) ABSTRACT

Systems and methods for enhanced or improved oil recovery includes injecting a Y-Grade NGL enhanced oil recovery fluid through an injection well into a hydrocarbon bearing reservoir to mobilize and displace hydrocarbons. The Y-Grade NGL enhanced oil recovery fluid comprises an unfractionated hydrocarbon mixture. Simultaneously and/or subsequently, a mobility control fluid is injected into the hydrocarbon bearing formation. Hydrocarbons from the hydrocarbon bearing reservoir are produced through a production well or the same injection well.

24 Claims, 6 Drawing Sheets

(56) References Cited

U.S. PATENT DOCUMENTS

| | | | |
|---|---|---|---|
| 8,505,332 B1 | 8/2013 | Prim | |
| 8,844,639 B2 | 9/2014 | Gupta et al. | |
| 9,488,040 B2 | 11/2016 | Chakrabarty et al. | |
| 9,534,836 B2 | 1/2017 | Dubettier-Grenier et al. | |
| 9,725,644 B2 | 8/2017 | Babcock et al. | |
| 2005/0189112 A1 | 9/2005 | Taylor et al. | |
| 2006/0243437 A1 | 11/2006 | Albers et al. | |
| 2006/0289166 A1 | 12/2006 | Stromquist et al. | |
| 2007/0000666 A1 | 1/2007 | Vozniak et al. | |
| 2007/0187340 A1 | 8/2007 | Oresti et al. | |
| 2008/0087041 A1 | 4/2008 | Denton et al. | |
| 2010/0032171 A1 | 2/2010 | Bali et al. | |
| 2012/0000660 A1 | 1/2012 | Gatlin et al. | |
| 2012/0037370 A1 | 2/2012 | Johnson | |
| 2012/0047942 A1 | 3/2012 | Kolodziej | |
| 2013/0168086 A1 | 7/2013 | Roberts | |
| 2013/0199774 A1 | 8/2013 | Sultenfuss et al. | |
| 2013/0213085 A1 | 8/2013 | Ward | |
| 2013/0220605 A1 | 8/2013 | Vandor | |
| 2013/0228330 A1 | 9/2013 | Loree et al. | |
| 2013/0299167 A1 | 11/2013 | Fordyce et al. | |
| 2014/0000899 A1 | 1/2014 | Nevison | |
| 2014/0124208 A1 | 5/2014 | Loree et al. | |
| 2014/0174747 A1 | 6/2014 | Kelly et al. | |
| 2014/0366577 A1 | 12/2014 | Zubrin et al. | |
| 2015/0021022 A1 | 1/2015 | Ladva et al. | |
| 2015/0060075 A1 | 3/2015 | Blom et al. | |
| 2015/0152318 A1 | 6/2015 | Travis | |
| 2015/0167550 A1 | 6/2015 | Vandervort et al. | |
| 2015/0184932 A1 | 7/2015 | Higginbotham et al. | |
| 2015/0233222 A1 | 8/2015 | Teklu et al. | |
| 2015/0368566 A1 | 12/2015 | Young et al. | |
| 2016/0069171 A1 | 3/2016 | Stancliffe et al. | |
| 2016/0122628 A1 | 5/2016 | Babcock et al. | |
| 2016/0238313 A1 | 8/2016 | Shotts | |
| 2016/0280607 A1 | 9/2016 | Land et al. | |
| 2017/0044425 A1 | 2/2017 | Barati Ghahfarokhi | |
| 2017/0218742 A1 | 8/2017 | Babcock et al. | |
| 2017/0218743 A1 | 8/2017 | Babcock et al. | |
| 2017/0275520 A1 | 9/2017 | Babcock et al. | |
| 2017/0275521 A1 | 9/2017 | Babcock et al. | |
| 2017/0275526 A1 | 9/2017 | Babcock et al. | |
| 2017/0292057 A1 | 10/2017 | Babcock et al. | |
| 2017/0292059 A1 | 10/2017 | Babcock et al. | |
| 2017/0292354 A1 | 10/2017 | Babcock et al. | |
| 2017/0298268 A1 | 10/2017 | Babcock et al. | |

FOREIGN PATENT DOCUMENTS

| | | |
|---|---|---|
| DE | 102014010105 A1 | 1/2016 |
| FR | 2466606 A1 | 4/1981 |
| GB | 2219818 A | 12/1989 |
| WO | 98/04807 A1 | 2/1998 |
| WO | 2010025540 A1 | 3/2010 |
| WO | 2012097424 A1 | 7/2012 |
| WO | 2015020654 A1 | 2/2015 |
| WO | 2015030908 A2 | 3/2015 |
| WO | 2016064645 A1 | 4/2016 |

OTHER PUBLICATIONS

Ginley, "Osudo Reservoir Fluid Study Jordan B No. 1 Well", http://ocdimage.emnrd.state.nm.us/imaging/filestore/SantaFeAdmin/CF/ADA-03-00539 Case Files Part 6/10796_ 4159.pdf, pp. 1,5; table 2, Jan. 1, 1992.

Holtz et al., "Summary Integrated Geologic and Engineering Determination of Oil-Reserve-Growth Potential in Carbonate Reservoirs", https://www.onepetro.org/download/journal-paper/SPE-22900-PA?id=journal-paper/SPE-22900-PA, p. 1250 and 1253, Jan. 1, 1992.

International Invitation to Pay Additional Fees dated Feb. 13, 2017, corresponding to Application No. PCT/ US2016/063132.

International Invitation to Pay Additional Fees dated Apr. 10, 2017, corresponding to Application No. PCT/ US2017/012561.

International Search Report and Written Opinion dated Jan. 8, 2016, corresponding to Application No. PCT/ US2015/055627.

International Search Report and Written Opinion dated Feb. 7, 2017, corresponding to Application No. PCT/ US2016/063140.

International Search Report and Written Opinion dated Feb. 7, 2017, corresponding to Application No. PCT/ US2016/063148.

International Search Report and Written Opinion dated Mar. 29, 2017, corresponding to Application No. PCT/ US2016/067454.

International Search Report and Written Opinion dated Mar. 30, 2017, corresponding to Application No. PCT/ US2016/067458.

International Search Report and Written Opinion dated Apr. 4, 2017, corresponding to Application No. PCT/ US2017/012566.

International Search Report and Written Opinion dated May 10, 2017, corresponding to Application No. PCT/ US2016/063127.

International Search Report and Written Opinino dated May 10, 2017, corresponding to Application No. PCT/ US2016/063132.

International Search Report and Written Opinion dated Jun. 7, 2017, corresponding to Application No. PCT/ US2017/012561.

International Search Report and Written Opinion dated Sep. 21, 2017, corresponding to Application No. PCT/ US2017/014696.

International Search Report and Written Opinion dated Nov. 7, 2017, corresponding to Application No. PCT/ US2017/019619.

M. Asadi et al., "Water-Free Fracturing: A Case History", Society of Petroleum Engineers, SPE-175988-MS, 14 Pages.

Nakashima et al., "SPE-177801-MS Development of a Giant Carbonate Oil Field, Part 2: Mitigation from Pressure Maintenance Developement to Sweep Oriented IOR Development", https:/lwww.onepetro.org/download/conference- 18 aper/SPE-177801-MS?id=conference-paper/SPE-177801-MS, pp. 1-8 and 12-16, Jan. 1, 2015.

Pazuki et al., "A modified Flory-Huggins model for prediction of asphaltenes precipitation in crude oil", Fuel, IPC Science and Technology Press, Guildford, GB, vol. 85, No. 7-8, pp. 1083-1086, May 1, 2016.

Qing Sun et al., "Quantification of uncertainity in recovery efficiency predictions: lessons learned from 250 mature carbonate fields", SPE 84459, pp. 1-15, Jan. 1, 2005.

S.Rassenfoss; "In Search of the Waterless Fracture", JPT, Jun. 30, 2013, pp. 46-54, XP055237780.

PCT International Search Report/Written Opinion dated Oct. 12, 2018 for Application No. PCT/US2018/044917.

Y-GRADE NGL FLUIDS FOR ENHANCED OIL RECOVERY

FIELD

Embodiments of the disclosure relate to systems and methods for enhanced and/or improved oil recovery using Y-Grade NGL.

BACKGROUND

Estimates of worldwide oil in-place range up to 1.5 trillion barrels. Using that figure, since conventional recovery methods (primary and secondary) typically extract one-third of the original oil-in-place in a reservoir, it is estimated that the oil remaining as residual oil saturation after conventional recovery would be approximately 1.0 trillion barrels. Several enhanced oil recovery (EOR) techniques generally grouped together as tertiary production schemes have targeted this resource. In the past, chemical, thermal, and miscible techniques have been used by the industry. These EOR techniques typically involve injection of chemical compounds dissolved in water, the injection of steam, or the injection of a gas that is miscible with the oil in place.

The choice of EOR technique to be used is also dependent on other considerations such as depth, temperature, and amount of oil remaining in place. Much of the design phase of an EOR project is spent in the search for the combination of processes and injection schemes that will maximize oil recovery relative to the cost of implementing a particular technique. Most injection materials in use today have properties that differ considerably from the hydrocarbons in the reservoirs. Such differences in properties can reduce extraction efficiency.

Therefore there is a need for new and improved enhanced and/or improved oil recovery techniques.

SUMMARY

In one embodiment, a method for enhanced or improved oil recovery comprises injecting a miscible injection fluid through an injection well into a hydrocarbon bearing reservoir to displace hydrocarbons, wherein the miscible injection fluid comprises an unfractionated hydrocarbon mixture that is miscible with hydrocarbons in the hydrocarbon bearing reservoir; injecting a mobility control fluid through the injection well into the hydrocarbon bearing formation after injection of the miscible injection fluid; and producing the displaced hydrocarbons through a production well.

DETAILED DESCRIPTION

Figure 1:
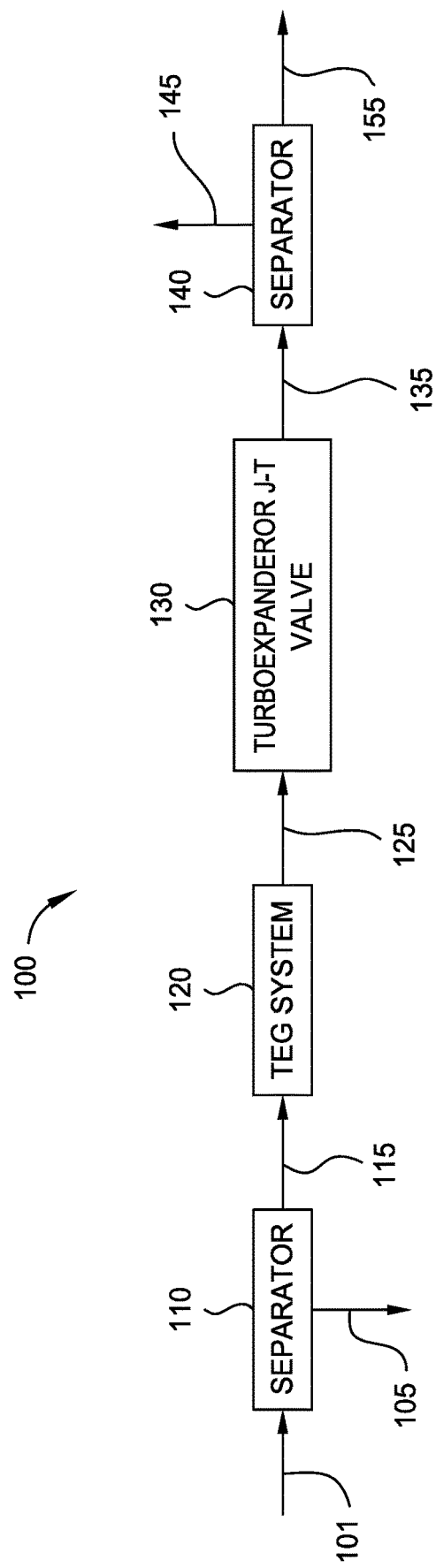
FIG. 1 is a schematic view of a system for obtaining Y-Grade NGL according to one embodiment.

Embodiments of the disclosure include enhanced oil recovery fluids used for the enhanced and/or improved oil recovery of residual hydrocarbons from hydrocarbon bearing reservoirs. The enhanced oil recovery fluids comprise naturally occurring, locally available components as a cost effective approach. The enhanced oil recovery fluids help reduce and/or eliminate interfacial tension of the residual hydrocarbons to enhance and/or improve oil recovery.

In one embodiment, the enhanced oil recovery fluids comprise Y-Grade natural gas liquids (referred to herein as Y-Grade NGL). Sweep efficiencies can be improved if Y-Grade NGL is injected into the reservoir in small volumes (also referred to as "slugs") that are alternated with slugs of a mobility control fluid, such as water, viscosified water, or nitrogen, as a means of lowering the mobility of the injected fluids. Y-Grade NGL is a low cost miscible solvent that is an excellent candidate for enhanced and/or improved hydrocarbon recovery.

Y-Grade NGL is an un-fractionated hydrocarbon mixture comprising ethane, propane, butane, isobutane, and pentane plus. Pentane plus comprises pentane, isopentane, and/or heavier weight hydrocarbons, for example hydrocarbon compounds containing at least one of C5 through C8+. Pentane plus may include natural gasoline for example.

Typically, Y-Grade NGL is a by-product of condensed and de-methanized hydrocarbon streams that are produced from shale wells for example and transported to a centralized facility. Y-Grade NGL can be locally sourced from a splitter facility, a natural gas plant, and/or a refinery and transported by tanker truck or pipeline to a point of use. In its un-fractionated or natural state (under certain pressures and temperatures, for example within a range of 250-600 psig and at wellhead or ambient temperature), Y-Grade NGL has no dedicated market or known use. Y-Grade NGL must undergo processing known as fractionation to create discrete components before its true value is proven.

The Y-Grade NGL composition can be customized for handling as a liquid under various conditions. Since the ethane content of Y-Grade NGL affects the vapor pressure, the ethane content can be adjusted as necessary. According to one example, Y-Grade NGL may be processed to have a low ethane content, such as an ethane content within a range of 3-12 percent by volume, to allow the Y-Grade NGL to be transported as a liquid in low pressure storage vessels. According to another example, Y-Grade NGL may be processed to have a high ethane content, such as an ethane content within a range of 38-60 percent by volume, to allow the Y-Grade NGL to be transported as a liquid in high pressure pipelines.

Y-Grade NGL differs from liquefied petroleum gas ("LPG"). One difference is that LPG is a fractionated product comprised of primarily propane, or a mixture of fractionated products comprised of propane and butane. Another difference is that LPG is a fractioned hydrocarbon mixture, whereas Y-Grade NGL is an unfractionated hydrocarbon mixture. Another difference is that LPG is produced in a fractionation facility via a fractionation train, whereas Y-Grade NGL can be obtained from a splitter facility, a natural gas plant, and/or a refinery. A further difference is that LPG is a pure product with the exact same composition, whereas Y-Grade NGL can have a variable composition.

In its unfractionated state, Y-Grade NGL is not an NGL purity product and is not a mixture formed by combining one or more NGL purity products. An NGL purity product is defined as an NGL stream having at least 90% of one type of carbon molecule. The five recognized NGL purity products are ethane (C2), propane (C3), normal butane (NC4), isobutane (IC4) and natural gasoline (C5+). The unfractionated hydrocarbon mixture is sent to a fractionation facility, where it is cryogenically cooled and passed through a fractionation train that consists of a series of distillation towers, referred to as deethanizers, depropanizers, and debutanizers, to fractionate out NGL purity products from the unfractionated hydrocarbon mixture. Each distillation tower generates an NGL purity product. Liquefied petroleum gas is an NGL purity product comprising only propane, or a mixture of two or more NGL purity products, such as propane and butane. Liquefied petroleum gas is therefore a fractionated hydrocarbon or a fractionated hydrocarbon mixture.

In one embodiment, Y-Grade NGL comprises 30-80%, such as 40-60%, for example 43%, ethane; 15-45%, such as 20-35%, for example 27%, propane; 5-10%, for example 7%, normal butane; 5-40%, such as 10-25%, for example 10%, isobutane; and 5-25%, such as 10-20%, for example 13%, pentane plus. Methane is typically less than 1%, such as less than 0.5% by liquid volume.

In one embodiment, Y-Grade NGL comprises condensed, dehydrated, desulfurized, and de-methanized natural gas stream components that have a vapor pressure of not more than about 600 psig at 100 degrees Fahrenheit, with aromatics below about 1 weight percent, and olefins below about 1 percent by liquid volume. Materials and streams useful for the embodiments described herein typically include hydrocarbons with melting points below about 0 degrees Fahrenheit.

In one embodiment, Y-Grade NGL may be mixed with a chemical agent. The chemical agent may be mixed with a solubilizing fluid to liquefy any dry chemicals to aid in mixing with the Y-Grade NGL. The solubilizing fluid may comprise fractionated or refined hydrocarbons, such as C3, C4, C5, C6, C7, C8, C9, and mixtures thereof. The solubilizing fluid may comprise C3+ hydrocarbons, including propane, butane, pentane, naphtha, toluene, diesel, natural gasoline, and any combination thereof.

FIG. 1 is a schematic view of a Y-Grade NGL system 100 for obtaining Y-Grade NGL, according to one embodiment, for use with embodiments described herein. The system 100 includes a first separator 110, a triethylene glycol ("TEG") system 120, a turboexpander 130 (or alternatively a Joule-Thompson valve), and a second separator 140. A hydrocarbon stream 101, such as a wet natural gas stream, flows into the first separator 110 where it is separated into a liquid stream 105 and a gas stream 115. The liquid stream 105 comprises liquid hydrocarbons and water. The gas stream 115 flows into the TEG system 120 where water vapor is removed to dehydrate the gas stream 115. The TEG system 120 dehydrates the gas stream 115 that is discharged from the first separator 110 to a water dew point up to −100 degrees Fahrenheit. The gas stream 125 exiting the TEG system 120 flows into the turboexpander 130 (or alternatively the Joule-Thompson valve), which cools the gas stream 125 to a temperature at or below 0 degrees Fahrenheit, for example to a temperature between 0 degrees Fahrenheit and −100 degrees Fahrenheit, for example about −30 degrees Fahrenheit.

The gas stream 125 is cooled to a temperature at or below 0 degrees Fahrenheit to condense out Y-Grade NGL from the remaining gas stream, which is primarily methane. The cooled fluids 135 flow into the second separator 140 where the gas stream 145, which is primarily methane, is separated out from the Y-Grade NGL 155. As a result, the Y-Grade NGL 155 is a byproduct of the condensed and de-methanized hydrocarbon stream 101.

In one embodiment, the gas stream 145 may also comprise ethane in an amount of about 1 percent to about 50 percent by volume. The amount of ethane separated out with the methane can be controlled by the pressure maintained in the second separator 140. The pressure in the second separator 140 may be about 600 psi or less. As the pressure is lowered in the second separator 140, the ethane content of the gas stream 145 is increased, and the ethane content of the Y-Grade NGL 155 is decreased. The Y-Grade NGL 155 may be used to form any of the enhanced oil recovery fluids and/or with any of the systems and methods described herein.

According to one example, Y-Grade NGL comprises about 43% ethane, about 27% propane, about 7% normal butane, about 10% isobutane, and about 13% pentane plus at a maximum vapor pressure of about 600 psig at 100 degrees Fahrenheit per American Society for Testing and Materials (ASTM) according to the standard testing procedure D-6378 with methane, aromatics, and olefin maximums of 0.5% L.V. % per GPA 2177, 1.0 wt % of total stream per GPA 2186 and 1.0 L.V. % per GPA 2186, respectively.

According to one example, Y-Grade NGL comprises about 28% ethane, about 42% propane, about 13% normal butane, about 7% isobutane, and about 10% pentane plus. According to one example, Y-Grade NGL comprises about 48% ethane, about 31% propane, about 9% normal butane, about 5% isobutane, and about 7% pentane plus. According to one example, Y-Grade NGL comprises about 37%-43% ethane, about 22%-23% propane, about 7% normal butane, about 9%-11% isobutane, and about 13%-16% pentane plus. According to one example, Y-Grade NGL comprises about 10%-20% of at least one hydrocarbon compound having five carbon elements ($C_5$) or more.

Y-Grade NGL may comprise one or more combinations, as a whole or in part, of the Y-Grade NGL examples and/or embodiments described herein.

Figure 2:
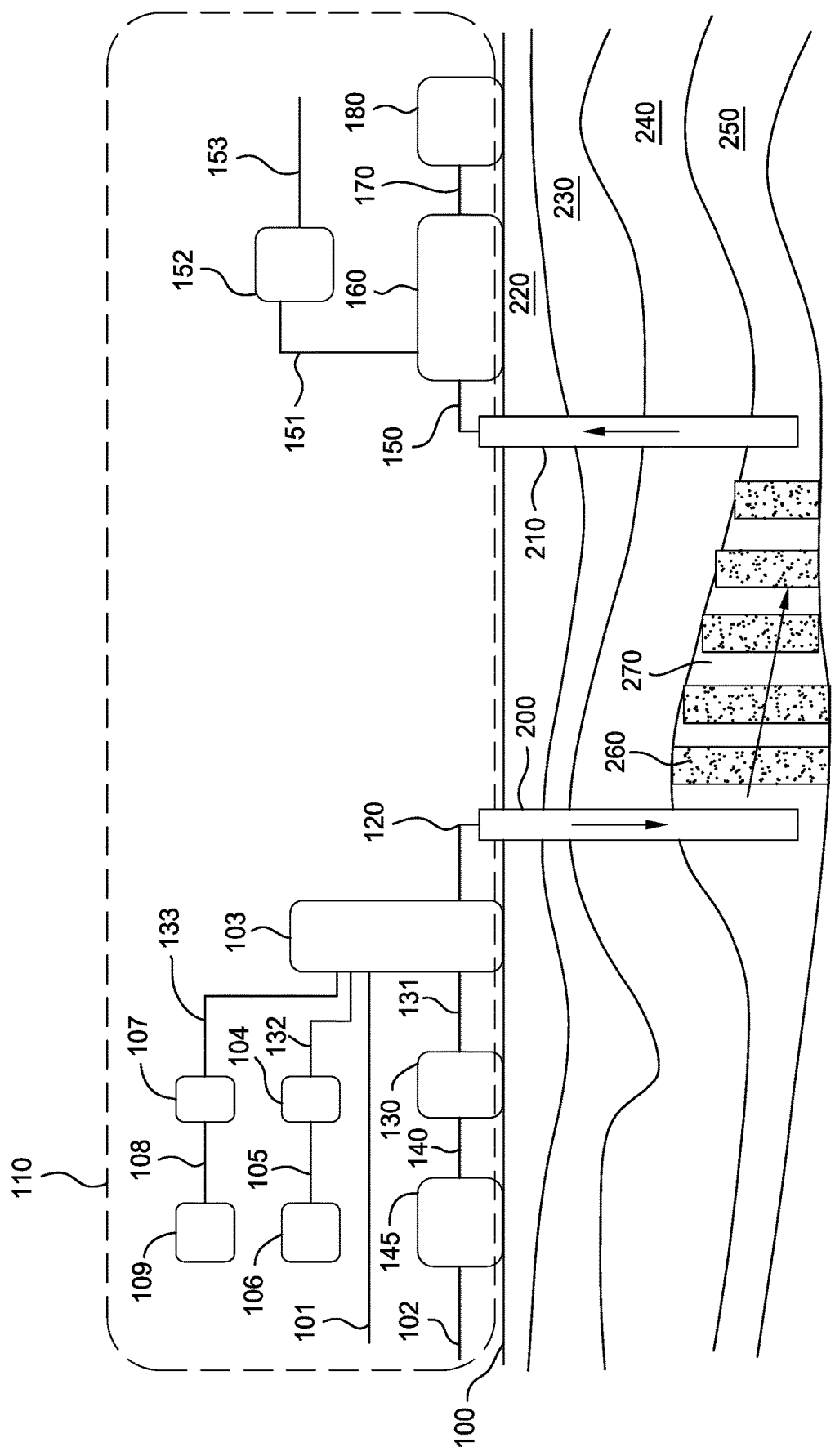
FIG. 2 is a sectional view of a hydrocarbon bearing reservoir according to one embodiment.

FIG. 2 is a schematic illustration of an injection and production system 110 disposed on surface 100 over a hydrocarbon bearing reservoir 250 according to one embodiment. The hydrocarbon bearing reservoir 250 is located below several formations and may be a carbonate reservoir, a clastic reservoir, or a residual oil zone (ROZ). In particular, a first subsurface formation 220 is disposed above a second subsurface formation 230, which is disposed above a third subsurface formation 240. The first, second, and third subsurface formations are disposed above the hydrocarbon bearing reservoir 250. An injection well 200 and a production well 210 are drilled through and traverse the first, second, and third subsurface formations 220-240 and terminate in the hydrocarbon bearing reservoir 250.

The injection and production system 110 includes injection facilities located on the surface 100. The injection facilities include a control module 103, a Y-Grade NGL supply 102, a nitrogen supply 101, a secondary fluid supply 106, and a chemical agent supply 109. The control module 103 is configured to continuously measure, monitor, and control the injection of fluids into the injection well 200 via one or more lines 120. The control module 103 may also be configured to communicate data regarding the fluids that are injected into the injection well 200 to a remote location via a communications network.

Y-Grade NGL from the Y-Grade NGL supply 102, which may be a pipeline, is fed into one or more storage tanks 145, which are connected via line 140 to one or more pumps 130 configured to inject Y-Grade NGL into the control module 103 via line 131. Gaseous nitrogen from the nitrogen supply 101, which may be a pipeline, also flows into the control module 103.

One or more secondary fluids from the secondary fluid supply 106 flows through line 105 by one or more pumps 104 and is discharged into the control module 103 via line 132. The secondary fluids may comprise at least one of aromatics, alkanes, and crude oil. Aromatics may comprise at least one of benzene, naphtha, xylene, toluene, fuel oils, olefins, and diesel. Alkanes may comprise at least one of heptane, octane, and hexane. Crude oil may comprise at least one of residual oil in the hydrocarbon bearing reservoir, heavy oil, medium oil, light oil, condensate, and residual oil in the ROZ.

One or more chemical agents from the chemical supply 109 flows through line 108 by one or more pumps 107 and is discharged into the control module 103 via line 133. The chemical agents may include non-aqueous based chemical agents and/or aqueous based chemical agents. The non-aqueous based chemical agents include but are not limited to non-aqueous based foaming agents, foam stabilizers, emulsifying agents, gelling agents, viscosity increasing agents, surfactants, nanoparticles, and combinations thereof. The aqueous based chemical agents include but are not limited to aqueous based foaming agents, foam stabilizers, emulsifying agents, gelling agents, viscosity increasing agents, surfactants, nanoparticles, breakers, friction reducers, scale inhibitors, bio-cides, acids, buffer/pH adjusting agents, clay stabilizers, corrosion inhibitors, crosslinkers, iron controls, solvents, and combinations thereof.

The control module 103 receives the Y-Grade NGL, the gaseous nitrogen, the secondary fluids, and the chemical agents and controls the combination and timing of the fluids that are injected into the injection well 200. In addition, the control module 103 can monitor and measure fluid levels, flow rates, pressures, and/or temperatures of the fluids going into and out of the control module 103. The control module 103 is configured to continuously adjust the mixture of fluids that are injected into the injection well 200 as needed to ensure optimum fluid recovery from the hydrocarbon bearing reservoir 250.

Referring to FIG. 2, alternating slugs of Y-Grade NGL, a chemical agent comprising a surfactant (such as a foaming agent), an optional secondary fluid, and gaseous nitrogen may be injected into the hydrocarbon bearing reservoir 250 through the injection well 200 by the control module 103 via the one or more lines 120. The control module 103 is configured to inject individual slugs 260 of Y-Grade NGL, the surfactant, and the optional secondary fluid, followed by the injection of individual slugs 270 of gaseous nitrogen. The control module 103 is configured to allow a mixture of the Y-Grade NGL, the surfactant, and the optional secondary fluid to be injected as the individual slugs 260, while ceasing injection of the gaseous nitrogen. Similarly, after a predetermined amount of time, the control module 103 is configured to allow gaseous nitrogen to be injected as the individual slugs 270, while ceasing injection of the Y-Grade NGL, the surfactant, and the optional secondary fluid.

In one embodiment, the Y-Grade NGL, the surfactant, the optional secondary fluid, and the gaseous nitrogen are mixed by the control module 103, such as within the control module 103 and/or by simultaneously injecting all of the fluids into the line 120, to create a hydrocarbon foam that is injected as a continuous slug into the hydrocarbon bearing reservoir 250.

The slugs 270 of gaseous nitrogen may be used as a mobility control fluid to inhibit the mobility of the injected fluids within the hydrocarbon bearing reservoir 250 to prevent a rapid breakthrough of the injected fluids from the injection well 200 to the production well 210. Improving the mobility ratio between the residual reservoir oil and the injected fluids improves the sweep and conformance efficiencies resulting in improved recovery of the hydrocarbons in the hydrocarbon bearing reservoir 250. Although described as being gaseous nitrogen, other mobility control fluids that may be used with the embodiments disclosed herein include but are not limited to carbon dioxide, nitrogen, natural gas, methane, LNG, ethane, water, and viscosified water.

The injected fluids help mobilize and displace fluids, including hydrocarbons, within the hydrocarbon bearing reservoir 250 to the production well 210. Y-Grade NGL, the surfactant, the optional secondary fluid, gaseous nitrogen, natural gas, formation water, and formation oil are produced to the surface 100 via the production well 210 and production facilities of the injection and production system 110 located on the surface 100. The production facilities include a three-phase separator 160, one or more storage tanks 180, and an optional nitrogen rejection system 152.

The produced fluids flow up through the production well 210 and into the three-phase separator 160 via line 150 where they are separated into liquids and gases. The separated liquids, e.g. oil and water, flow into the storage tanks 180 via line 170. The separated gases, e.g. nitrogen and hydrocarbon gases, flow into the optional nitrogen rejection system 152 via line 151 where the nitrogen is discharged into the atmosphere and the hydrocarbon gases are discharged into a gas sales line 153. In the event of no nitrogen contamination in the produced fluids, the separated gases may be discharged directly into the gas sales line 153 without the nitrogen rejection system 152.

At the conclusion of the injection of the enhanced oil recovery fluids, the control module 103 is configured to inject a final displacement fluid into the hydrocarbon bearing reservoir 250 to fully displace the enhanced oil recovery fluids and/or any mobilized hydrocarbons to the production well 210. The enhanced oil recovery fluids may comprise about 30%-50% of the pore volume of the hydrocarbon bearing reservoir 250 and the final displacement fluid may comprise about 50%-70% of the pore volume of the hydrocarbon bearing reservoir 250. The final displacement fluid may include, but is not limited to carbon dioxide, nitrogen, natural gas, methane, LNG, ethane, water, viscosified water, and/or combinations thereof.

Figure 3:
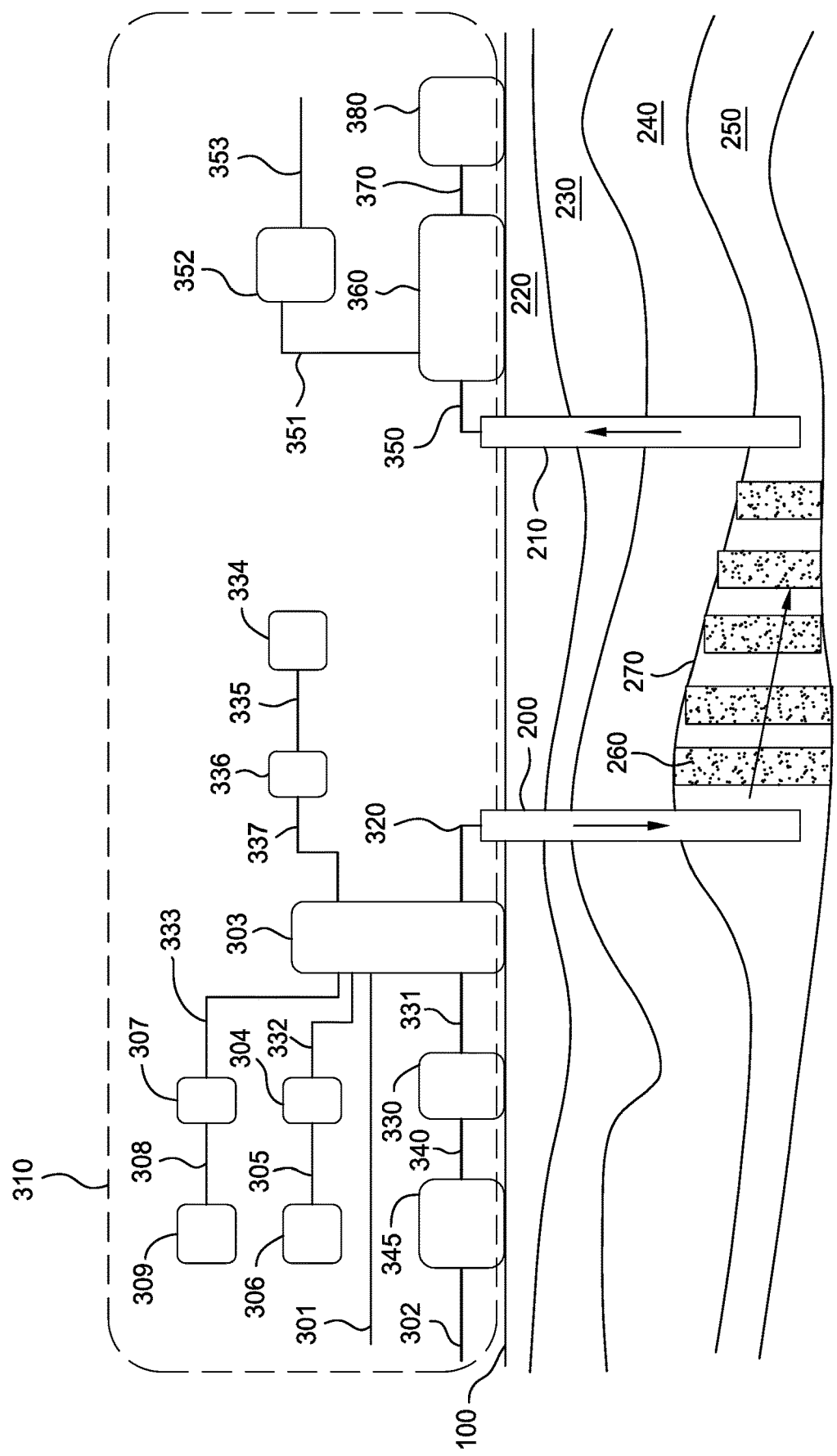
FIG. 3 is a sectional view of a hydrocarbon bearing reservoir according to one embodiment.

FIG. 3 is a schematic illustration of an injection and production system 310 that is similar to the injection and production system 210. The components that are the same have the same base reference number but are designated with a 300-series reference number and a full description of each component will not be repeated herein for brevity. One difference of the injection and production system 310 is the addition of a water supply 334 as part of the injection facilities. The water supply 334 is connected to one or more pumps 336 via line 335, which pumps water to the control module 103 via line 337. The water supplied by the water supply 334 may include brine, seawater, formation water, or potassium chloride water. The potassium chloride water comprises up to 4% potassium chloride. The water may comprise up to 10% of the liquid phase of the enhanced oil recovery fluid.

Referring to FIG. 3, alternating slugs of Y-Grade NGL, a chemical agent comprising a surfactant (which may act as a foaming agent and/or an emulsifying agent), water, an optional secondary fluid, and gaseous nitrogen may be injected into the hydrocarbon bearing reservoir 250 through the injection well 200 by the control module 303 via the one or more lines 320. The control module 303 is configured to inject individual slugs 260 of Y-Grade NGL, the surfactant, water, and the optional secondary fluid, followed by the injection of individual slugs 270 of gaseous nitrogen. The control module 103 is configured to allow a mixture of the Y-Grade NGL, the surfactant, water, and the optional secondary fluid to be injected as the individual slugs 260, while ceasing injection of the gaseous nitrogen. Similarly, after a predetermined amount of time, the control module 303 is configured to allow gaseous nitrogen to be injected as the individual slugs 270, while ceasing injection of the Y-Grade NGL, the surfactant, water, and the optional secondary fluid.

In one embodiment, the Y-Grade NGL, the surfactant, water, the optional secondary fluid, and the gaseous nitrogen are mixed by the control module 303, such as within the control module 303 and/or by simultaneously injecting all of the fluids into the line 320, to create a emulsion based foam that is injected as a continuous slug into the hydrocarbon bearing reservoir 250.

The injected fluids help mobilize and displace fluids, including hydrocarbons, within the hydrocarbon bearing reservoir 250 to the production well 210. Y-Grade NGL, the surfactant, the injected water, the optional secondary fluid, gaseous nitrogen, natural gas, formation water, and formation oil are produced to the surface 100 via production well 210 where they are separated by the production facilities as described above. At the conclusion of the injection of the enhanced oil recovery fluids, a final displacement fluid may be injected into the hydrocarbon bearing reservoir 250 to fully displace the enhanced oil recovery fluids and/or any mobilized hydrocarbons to the production well 210.

Figure 4:
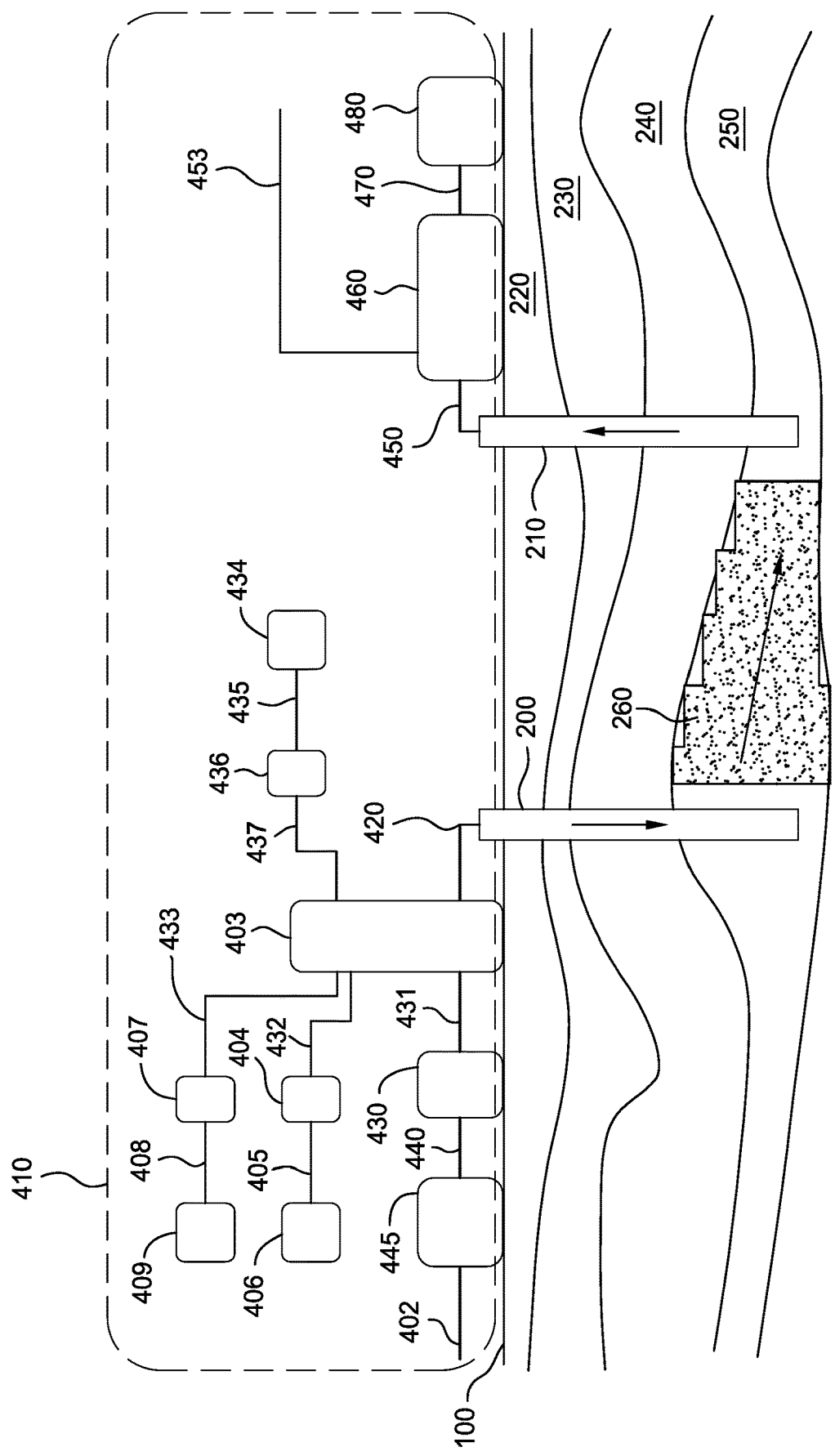
FIG. 4 is a sectional view of a hydrocarbon bearing reservoir according to one embodiment.

FIG. 4 is a schematic illustration of an injection and production system 410 that is similar to the injection and production system 310. The components that are the same have the same base reference number but are designated with a 400-series reference number and a full description of each component will not be repeated herein for brevity. Two differences of the injection and production system 410 are the removal of the nitrogen supply 301 from the injection facilities and the removal of the nitrogen rejection system 352 from the production facilities.

Referring to FIG. 4, a continuous slug 260 of Y-Grade NGL, a chemical agent comprising an emulsifying agent (such as a surfactant), water, and an optional secondary fluid may be injected into the hydrocarbon bearing reservoir 250 through the injection well 200 by the control module 403 via the one or more lines 420. The Y-Grade NGL, the emulsifying agent, water, and the optional secondary fluid are mixed by the control module 403, such as within the control module 403 and/or by simultaneously injecting all of the fluids into the line 420, to create an emulsion that is injected as the continuous slug 260 into the hydrocarbon bearing reservoir 250.

The injected fluids help mobilize and displace fluids, including hydrocarbons, within the hydrocarbon bearing reservoir 250 to the production well 210. Y-Grade NGL, the emulsifying agent, the injected water, the optional secondary fluid, natural gas, formation water, and formation oil are produced to the surface 100 via production well 210 where they are separated by the production facilities as described above. At the conclusion of the injection of the enhanced oil recovery fluids, a final displacement fluid may be injected into the hydrocarbon bearing reservoir 250 to fully displace the enhanced oil recovery fluids and/or any mobilized hydrocarbons to the production well 210.

Figure 5:
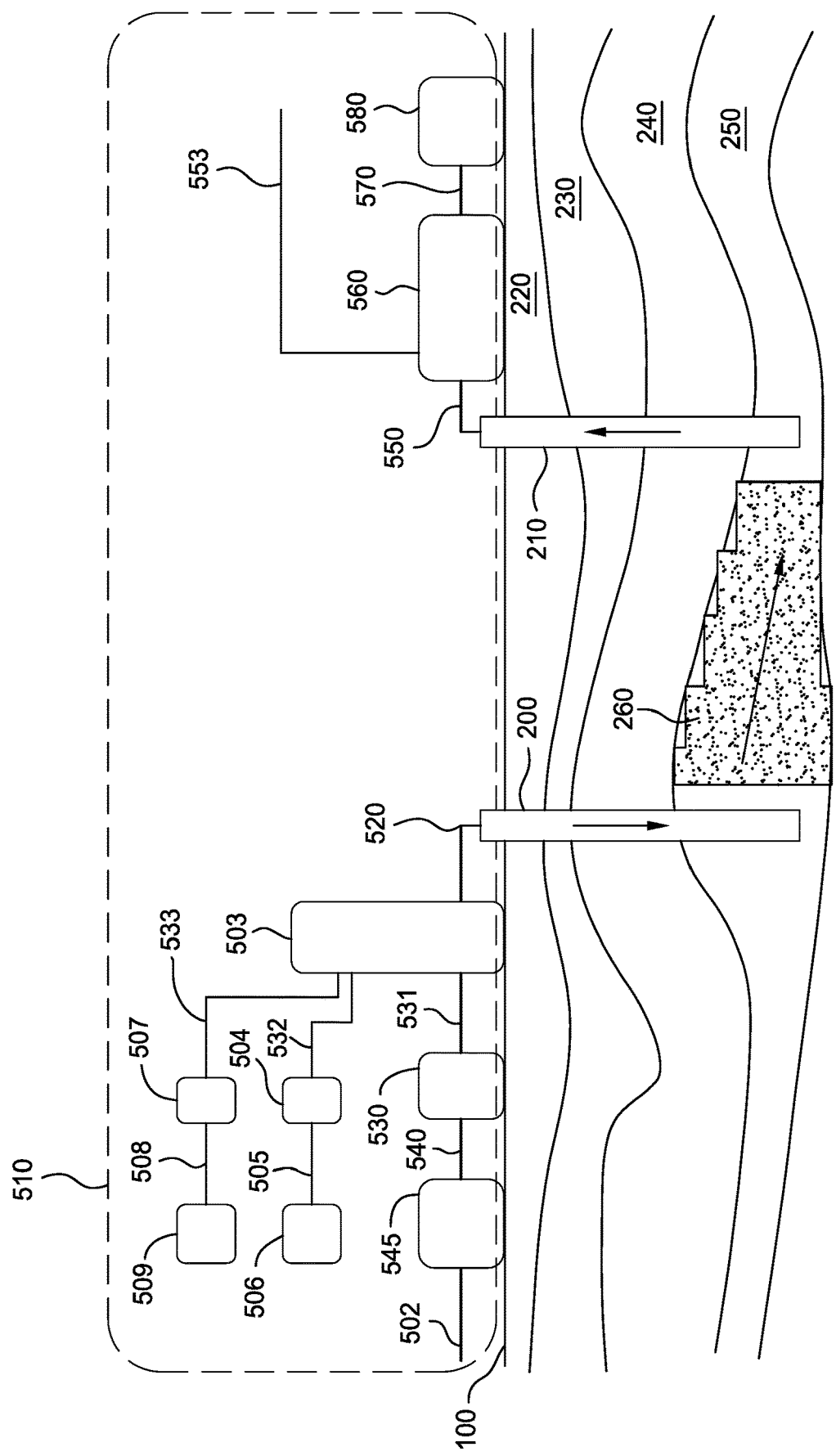
FIG. 5 is a sectional view of a hydrocarbon bearing reservoir according to one embodiment.

FIG. 5 is a schematic illustration of an injection and production system 510 that is similar to the injection and production system 410. The components that are the same have the same base reference number but are designated with a 500-series reference number and a full description of each component will not be repeated herein for brevity. One difference of the injection and production system 510 is the removal of the water supply 434 from the injection facilities.

Referring to FIG. 5, a continuous slug 260 of Y-Grade NGL, a chemical agent comprising a gelling agent, and an optional secondary fluid may be injected into the hydrocarbon bearing reservoir 250 through the injection well 200 by the control module 503 via the one or more lines 520. The Y-Grade NGL, the gelling agent, and the optional secondary fluid are mixed by the control module 503, such as within the control module 503 and/or by simultaneously injecting all of the fluids into the line 520, to create a gelled enhanced oil recovery fluid that is injected as the continuous slug 260 into the hydrocarbon bearing reservoir 250.

The injected fluids help mobilize and displace fluids, including hydrocarbons, within the hydrocarbon bearing reservoir 250 to the production well 210. Y-Grade NGL, the gelling agent, the optional secondary fluid, natural gas, formation water, and formation oil are produced to the surface 100 via production well 210 where they are separated by the production facilities as described above. At the conclusion of the injection of the enhanced oil recovery fluids, a final displacement fluid may be injected into the hydrocarbon bearing reservoir 250 to fully displace the enhanced oil recovery fluids and/or any mobilized hydrocarbons to the production well 210.

Figure 6:
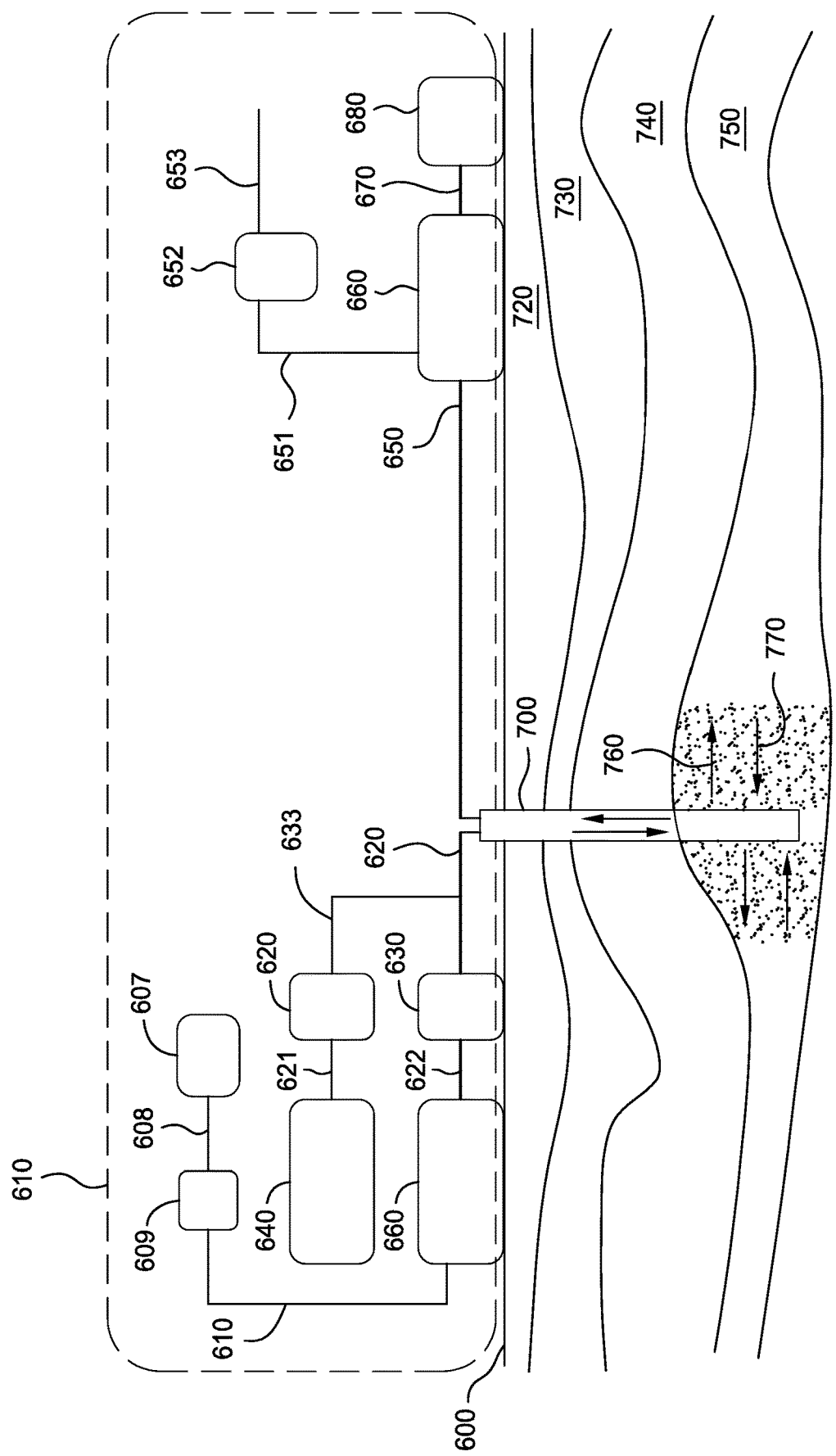
FIG. 6 is a sectional view of a hydrocarbon bearing reservoir according to one embodiment.

FIG. 6 is a schematic illustration of an injection and production system 610 disposed on surface 600 over a hydrocarbon bearing reservoir 750 according to one embodiment. The hydrocarbon bearing reservoir 750 is located below several formations. In particular, a first subsurface formation 720 is disposed above a second subsurface formation 730, which is disposed above a third subsurface formation 740. The first, second, and third subsurface formations are disposed above the hydrocarbon bearing reservoir 750. An injection well 700 is drilled through and traverses the first, second, and third subsurface formations 720-740 and terminates in the hydrocarbon bearing reservoir 750.

The injection and production system 610 includes injection facilities located on the surface 600. The injection facilities include a Y-Grade NGL supply 660, a nitrogen supply 640, and a chemical agent supply 607. A chemical agent comprising nanoparticles from the chemical agent supply 607 is pumped by one or more pumps 608 to the Y-Grade NGL supply 660 via lines 608 and 610. The Y-Grade NGL and nanoparticles are pumped by one or more pumps 630 via line 622 into the line 620, where they are then injected through the injection well 700 into the hydrocarbon bearing reservoir 750 as indicated by reference arrow 760.

After injection of the Y-Grade NGL and nanoparticles, liquid nitrogen from the nitrogen supply 640 is fed into a vaporizer 620 via line 621 where it is vaporized into gaseous nitrogen and discharged via line 633 into line 620. The gaseous nitrogen is then injected through the injection well 700 into the hydrocarbon bearing reservoir 750 to help displace the Y-Grade NGL and nanoparticles further into the reservoir where they are allowed to soak for a predetermine amount of time.

After a predetermined amount of time, the injected fluids help mobilize and displace fluids, including hydrocarbons, within the hydrocarbon bearing reservoir 750 for subsequent production back up through the same injection well 700, a process also known as "Huff-n-Puff". Y-Grade NGL, the nanoparticles, gaseous nitrogen, natural gas, formation water, and formation oil as identified by reference arrow 770 are produced to the surface 600 via the injection well 700 to production facilities of the injection and production system 610 located on the surface 600. The production facilities include a three-phase separator 660, one or more storage tanks 680, and an optional nitrogen rejection system 652.

The produced fluids flow up through the injection well 700 and into the three-phase separator 660 via line 650 where they are separated into liquids and gases. The separated liquids, e.g. oil and water, flow into the storage tanks 680 via line 770. The separated gases, e.g. nitrogen and hydrocarbon gases, flow into the optional nitrogen rejection system 652 via line 651 where the nitrogen is discharged into the atmosphere and the hydrocarbon gases are discharged into a gas sales line 653. In the event of no nitrogen contamination in the produced fluids, the separated gases may be discharged directly into the gas sales line 653 without the nitrogen rejection system 652.

The injection wells described above may include an array of vertical and/or horizontal injection wells. The production wells described above may include an array of vertical and/or horizontal production wells.

The supply of Y-Grade NGL may be provided in Y-Grade NGL storage tanks that comprise of onsite Y-Grade NGL pressurized storage vessels that are supplied from a regional Y-Grade NGL gathering pipeline, a regional gas splitter, or a gas processing facility via tanker trucks.

The enhanced oil recovery fluids, such as the hydrocarbon foam, the emulsion based foam, the emulsion, and the gelled enhanced oil recovery fluids disclosed herein may comprise a chemical agent comprising a surfactant, wherein the surfactant comprises at least one of a nonionic surfactant, an anionic surfactant, and a cationic surfactant, wherein the surfactant comprises a mass concentration of up to 5% of the enhanced oil recovery fluid.

The enhanced oil recovery fluids, such as the emulsion, disclosed herein may comprise a viscosifier, wherein the viscosifier comprises at least one of a hydrocarbon soluble copolymer and a water soluble viscosifier. The water soluble viscosifer comprises at least one of water soluble copolymers, polysaccharides, guar gum, viscoelastic surfactants, crosslinkers, cellulosic viscosifiers, and hydroxyethyl cellulose.

The enhanced oil recovery fluids, such as the hydrocarbon foam, the emulsion based foam, the emulsion, and the gelled enhanced oil recovery fluids disclosed herein may comprise non-aqueous based chemical agents. The non-aqueous based chemical agents include but are not limited to non-aqueous based foaming agents, foam stabilizers, emulsifying agents, gelling agents, viscosity increasing agents, surfactants, nanoparticles, and combinations thereof.

The enhanced oil recovery fluids, such as the emulsion based foam and the emulsion, disclosed herein may comprise aqueous based chemical agents. The aqueous based chemical agents include but are not limited to aqueous based foaming agents, foam stabilizers, emulsifying agents, gelling agents, viscosity increasing agents, surfactants, nanoparticles, breakers, friction reducers, scale inhibitors, biocides, acids, buffer/pH adjusting agents, clay stabilizers, corrosion inhibitors, crosslinkers, iron controls, solvents, and combinations thereof.

The enhanced oil recovery fluids, such as the hydrocarbon foam and the emulsion based foam, disclosed herein may comprise foaming agents. The foaming agents include but are not limited to nonionic surfactants, wherein the nonionic surfactants comprise at least one of a siloxane surfactant, a fluorosurfactant, a fatty acid ester, a glyceride, a silicon emulsifier, a hydrophobic silica powder, and combinations thereof.

The foaming agents may also include but are not limited to surfactants, such as nonionic surfactants, anionic surfactants, cationic surfactants, iC90-glycol, iC10-glycol, 1-propanol, iso-propanol, 2-butanol, butyl glycol, sulfonic acids, betaine compounds, fluorosurfactants, hydrocarbon solvents, aluminum soaps, phosphate esters, alcoholethersulfates, alcohol sulfate, alcylsulfates, isethionates, sarconisates, acylsarcosinates, olefinsulfonates, alcylethercarboxylates, alcylalcoholam ides, aminoxids, alkylbenzolsulfonate, alkylnaphthalene sulfonates, fattyalcohol ethoxylates, oxo-alcohol ethoxylates, alkylethoxylates, alkylphenolethoxylates, fattyamin- and fattyamidethoxylates, alkylpolyglucosides, oxoalcohol ethoxylates, guerbetalcohol alkoxylates, alkylethersulfonate, EO/PO blockpolymers, betaines, cocamidopropylbetaine, C8-C10 alkylamidopropylbetaine, sulfobetaines, alkenylsulfonates, alkylglykols, alcoholalkoxylates, sulfosuccinates, alkyletherphosphates, esterquats, dialcylammoniumderivatives, trialcylammoniumderivatives, and combinations thereof.

The enhanced oil recovery fluids, such as the hydrocarbon foam and the emulsion based foam, disclosed herein may comprise foam stabilizers. The foam stabilizers include but are not limited to hydrocarbon soluble copolymers, proteins, microparticles, nanoparticles, silica, and silica derivatives that are known to stabilize foam and emulsions through so-called "pickering". The foam stabilizers may comprise additives that increase the viscosity of the enhanced oil recovery fluid composing the lamella, such as polymeric structures.

The enhanced oil recovery fluids, such as the gelled enhanced oil recovery fluids, disclosed herein may comprise gelling agents. The gelling agents include but are not limited to hydrocarbon soluble copolymers, phosphate esters, organo-metallic complex cross-linkers, amine carbamates, aluminum soaps, cocoamine (C12-C14), sebacoyl chloride, oley (C18) amine, toulen-2,4-diisocyanate, tolune-2,6-diisolcyanate, and combinations thereof.

The enhanced oil recovery fluids, such as the hydrocarbon foam, the emulsion based foam, the emulsion, and the gelled enhanced oil recovery fluids disclosed herein may comprise secondary fluids. The secondary fluids include but are not limited to aromatics, alkanes, crude oils, and combinations thereof. The secondary fluid may comprises 10% or less by volume of the enhanced oil recovery fluids described herein. The aromatics may comprise at least one of benzene, naphtha, xylene, toluene, fuel oils, olefins, and diesel. The alkanes may comprise at least one of heptane, octane, and hexane. The crude oil may comprise at least one of residual oil in the hydrocarbon bearing reservoir, heavy oil, medium oil, light oil, condensate, and residual oil in the ROZ.

The enhanced oil recovery fluids disclosed herein may comprise an unfractionated hydrocarbon mixture comprising ethane, propane, butane, isobutane, and pentane plus, wherein the ethane, propane, and butane comprise at least 75% by volume of the unfractionated hydrocarbon mixture.

The enhanced oil recovery fluids disclosed herein may comprise an unfractionated hydrocarbon mixture comprising ethane, propane, butane, isobutane, and pentane plus, wherein the ethane comprises at least 3% by volume of the unfractionated hydrocarbon mixture.

The enhanced oil recovery fluids may comprise an unfractionated hydrocarbon mixture comprising ethane, propane, butane, isobutane, and pentane plus, wherein the pentane plus comprises less than 30% by volume of the unfractionated hydrocarbon mixture.

The enhanced oil recovery fluids disclosed herein may be formed with any type of gas, such as carbon dioxide, nitrogen, natural gas, methane, LNG, and/or ethane, and include one or more foaming agents, such as a surfactant, to form a hydrocarbon foam. The gas content of the enhanced oil recovery fluid may be between about 55% to about 95% by volume.

While the foregoing is directed to certain embodiments, other and further embodiments may be devised without departing from the basic scope thereof, and the scope thereof is determined by the claims that follow.

The invention claimed is:

1. A method for enhanced or improved oil recovery, comprising:
    injecting a Y-Grade NGL enhanced oil recovery fluid through an injection well into a hydrocarbon bearing reservoir to mobilize and displace hydrocarbons, wherein the Y-Grade NGL enhanced oil recovery fluid comprises an unfractionated hydrocarbon mixture that is a byproduct of a condensed and de-methanized hydrocarbon stream that is miscible with hydrocarbons in the hydrocarbon bearing reservoir, wherein the unfractionated hydrocarbon mixture comprises ethane, propane, and butane in an amount of at least 75% by volume, and wherein the unfractionated hydrocarbon mixture comprises pentane plus in an amount less than 30% by volume, wherein the unfractionated hydrocarbon mixture is condensed out of the hydrocarbon stream at a temperature at or below 0 degrees Fahrenheit;
    injecting a mobility control fluid through the injection well into the hydrocarbon bearing formation to inhibit mobility of the Y-Grade NGL enhanced oil recovery fluid from the injection well to a production well; and
    producing hydrocarbons through the production well.

2. The method of claim 1, wherein the injection well comprises an array of vertical or horizontal injection wells, and wherein the production well comprises an array of vertical or horizontal production wells offset from the array of injection wells.

3. The method of claim 1, further comprising alternating injections of the Y-Grade NGL enhanced oil recovery fluid with injections of the mobility control fluid into the hydrocarbon bearing reservoir.

4. The method of claim 1, wherein the mobility control fluid comprises at least one of carbon dioxide, nitrogen, natural gas, methane, LNG, ethane, water, and viscosified water.

5. The method of claim 1, further comprising injecting a final displacement fluid into the hydrocarbon bearing reservoir at the conclusion of the injection of the Y-Grade NGL enhanced oil recovery fluid, wherein the final displacement fluid comprises at least one of carbon dioxide, nitrogen, natural gas, methane, LNG, ethane, water, and viscosified water.

6. The method of claim 1, wherein the hydrocarbon bearing reservoir is a carbonate reservoir, a clastic reservoir, or a residual oil zone (ROZ).

7. The method of claim 1, further comprising mixing the Y-Grade NGL enhanced oil recovery fluid, the mobility control fluid, and a surfactant to form a hydrocarbon foam, wherein the mobility control fluid is a gas comprising at least one of carbon dioxide, nitrogen, natural gas, methane, and ethane.

8. The method of claim 7, wherein the surfactant is at least one of a nonionic surfactant and anionic surfactant, wherein the surfactant comprises a mass concentration of up to 5%.

9. The method of claim 8, wherein the nonionic surfactant comprises at least one of a siloxane surfactant, a fluorosurfactant, a fatty acid ester, a glyceride, and a silicon emulsifier.

10. The method of claim 7, further comprising adding a foam stabilizer to the hydrocarbon foam, wherein the foam stabilizer comprises a hydrocarbon soluble copolymer.

11. The method of claim 7, further comprising adding a secondary fluid to the hydrocarbon foam, wherein the secondary fluid comprises at least one of aromatics, alcohols, alkanes, and crude oil, and wherein the secondary fluid comprises 10% or less by volume of the hydrocarbon foam.

12. The method of claim 11, wherein the crude oil comprises at least one of residual oil in the hydrocarbon bearing reservoir, heavy oil, medium oil, light oil, condensate, and residual oil in the ROZ.

13. The method of claim 7, further comprising adding nanoparticles to the hydrocarbon foam.

14. The method of claim 1, further comprising mixing the Y-Grade NGL enhanced oil recovery fluid, the mobility control fluid, a surfactant, and water to form an emulsion based foam, wherein the mobility control fluid is a gas.

15. The method of claim 14, wherein the surfactant acts as a foaming agent, an emulsifying agent, or both.

16. The method of claim 14, wherein the water is formation water and comprises up to 10% of the liquid phase of the emulsion based foam.

17. The method of claim 14, wherein the water is potassium chloride water and comprises up to 10% of the liquid phase of the emulsion based foam, wherein the potassium chloride water comprises up to 4% potassium chloride.

18. The method of claim 14, wherein the gas comprises at least one of nitrogen, carbon dioxide, natural gas, methane, and ethane.

19. The method of claim 14, wherein the surfactant is at least one of a nonionic surfactant, an anionic surfactant, and a cationic surfactant, wherein the surfactant comprises a mass concentration of up to 5%.

20. The method of claim 19, wherein the nonionic surfactant comprises at least one of a siloxane surfactant, a fluorosurfactant, a fatty acid ester, a glyceride, and a silicon emulsifier.

21. The method of claim 14, further comprising adding a foam stabilizer to the emulsion based foam, wherein the foam stabilizer comprises at least one of a hydrocarbon soluble copolymer and a water soluble copolymer.

22. The method of claim 14, further comprising adding a secondary fluid to the emulsion based foam, wherein the secondary fluid comprises at least one of aromatics, alcohols, alkanes, and crude oil, and wherein the secondary fluid comprises 10% or less by volume of the emulsion based foam.

23. The method of claim 22, wherein the crude oil comprises at least one of residual oil in the hydrocarbon bearing reservoir, heavy oil, medium oil, light oil, condensate, and residual oil in the ROZ.

24. The method of claim 14, further comprising adding nanoparticles to the emulsion based foam.

* * * * *